United States Patent
Kamo

(10) Patent No.: US 6,815,485 B2
(45) Date of Patent: Nov. 9, 2004

(54) RESIN COMPOSITION

(75) Inventor: Hiroshi Kamo, Chiba (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 305 days.

(21) Appl. No.: 10/018,753

(22) PCT Filed: Apr. 23, 2001

(86) PCT No.: PCT/JP01/03458

§ 371 (c)(1),
(2), (4) Date: Dec. 21, 2001

(87) PCT Pub. No.: WO01/81471

PCT Pub. Date: Nov. 1, 2001

(65) Prior Publication Data

US 2003/0050374 A1 Mar. 13, 2003

(30) Foreign Application Priority Data

Apr. 25, 2000 (JP) .......................... 2000-123499

(51) Int. Cl.$^7$ .......................... C08K 5/098; C08K 3/22; C08K 3/30; C08L 71/12; C08G 65/48

(52) U.S. Cl. .................. 524/399; 524/418; 524/432; 524/433; 525/391; 525/396; 525/397

(58) Field of Search ................... 524/399, 432, 524/433, 418; 525/391, 396, 397

(56) References Cited

U.S. PATENT DOCUMENTS

| | | | | |
|---|---|---|---|---|
| 4,654,405 A | * | 3/1987 | Jalbert et al. | 525/391 |
| 4,888,397 A | * | 12/1989 | van der Meer et al. | 525/391 |
| 5,278,254 A | | 1/1994 | Furuta et al. | |
| 5,498,689 A | * | 3/1996 | Furuta et al. | 528/214 |
| 5,990,256 A | * | 11/1999 | Newman et al. | 526/340 |

FOREIGN PATENT DOCUMENTS

| | | |
|---|---|---|
| EP | 0747438 A2 | 12/1996 |
| EP | 0823457 A2 | 2/1998 |
| JP | 5-86228 | 4/1993 |
| JP | 5-86228 A | 4/1993 |
| JP | 6-322258 | 11/1994 |
| JP | 6-322258 A | 11/1994 |
| JP | 7-508550 | 9/1995 |
| JP | 7-508550 A | 9/1995 |
| JP | 9-137056 A | 5/1997 |
| JP | 9-137056 | 5/1997 |
| JP | 10-114857 | 5/1998 |
| JP | 10-114857 A | 5/1998 |
| JP | 2000-191769 | 7/2000 |
| JP | 2000-191769 A | 7/2000 |
| WO | WO87/00540 | 1/1987 |
| WO | WO 99/02607 | 1/1999 |

* cited by examiner

Primary Examiner—Tae H. Yoon
(74) Attorney, Agent, or Firm—Birch, Stewart, Kolasch & Birch, LLP

(57) ABSTRACT

An object of the invention is to provide a resin composition with which color tone, moldability, heat resistance, flame retardancy and mechanical properties are simultaneously attained each in a sufficient level and which is particularly excellent in color tone and less generation of foreign matter.

Specifically, the present invention provides a resin composition obtained by melt-kneading: (A) 99 to 1 wt. % of a functionalized polyphenylene ether resin obtained by reacting a mixture of: (a) 100 parts by weight of a polyphenylene ether, and (b) 0.01 to 10.0 parts by weight of a modifier selected from non-aromatic conjugated diene compounds, dienophile compounds having one dienophile group and precursors for these diene or dienophile compounds at a reaction temperature of from room temperature to the melting point of (a); and (B) 1 to 99 wt. % of a liquid-crystal polyester.

13 Claims, No Drawings

RESIN COMPOSITION

This application is the national phase under 35 U.S.C. § 371 of PCT International Application No. PCT/JP01/03458 which has an International filing date of Apr. 23, 2001, which designated the United States of America.

TECHNICAL FIELD

The present invention relates to novel resin compositions which can be utilized for molded products obtained by injection molding or extrusion molding, that are excellent in the balance among heat resistance, flame retardancy, moldability and mechanical properties, and particularly, are excellent in color tone and less generation of foreign matter.

BACKGROUND ART

In general, polyphenylene ethers are resins having excellent properties, for example, in heat resistance, hot water resistance, size stability and mechanical and electrical properties, but are accompanied with drawbacks such as poor moldability owing to their high melt viscosity, bad chemical resistance and low impact resistance. With a view to improving such defects of polyphenylene ethers, alloying them with another resin or modification of them have conventionally been conducted.

For example, JP-B-52-19864 (The term "JP-B" as used herein means an "examined Japanese patent publication") and JP-B-52-30991 propose, as a technique related to modification of polyphenylene ethers, processes for obtaining a functionalized polyphenylene ether by, in the presence of a radical generator, mixing a polyphenylene ether in the solution form with styrene and maleic anhydride or another copolymerizable compound for modification and effecting polymerization for long hours. These processes require a dissolving step, polymerizing step and moreover, solvent removal step, leading to an increase in the cost of equipment and energy.

JP-B-3-52486, U.S. Pat. No. 4,654,405, JP-A-62-132924 (The term "JP-A" as used herein means an "unexamined published Japanese patent application"), U.S. Pat. No. 4,888,397, JP-W-63-500803 (The term "JP-W" as used herein means a "published Japanese national stage of international application") and JP-A-63-54425 propose processes for obtaining a functionalized polyphenylene ether by mixing, in the presence or absence of a radical generator, a polyphenylene ether with maleic anhydride or another reactive compound for modification and modifying it in a molten state by melt-kneading, etc. In these processes, however, the temperature at which a polyphenylene ether can be melt-kneaded is remarkably high and the melt viscosity of the polyphenylene ether is considerably high. The necessity of a markedly high temperature for reaction causes various problems.

A functionalized polyphenylene ether obtained by the conventional melt-kneading method inevitably goes through processing at a high temperature close to its decomposition temperature so that a color change due to thermal deterioration occurs and this functionalized polyphenylene ether resin involves a problem in color tone. In addition, black foreign matter remains in the molded product as a carbide derived from the polyphenylene ether, causing a lowering in insulation properties or appearance. Accordingly, the functionalized polyphenylene ethers obtained by conventional techniques cannot meet the request of the industrial world sufficiently because of problems in equipment or energy, or insufficient balance among color tone, appearance, heat resistance and mechanical properties.

As a technique related to alloying of a polyphenylene ether with another resin, for example, U.S. Pat. No. 4,386,174 and JP-A-56-115357 propose a process of mixing polymers, for example, a polyphenylene ether and a liquid-crystal polyester, thereby improving melt processability of the polyphenylene ether. The improvement is however not insufficient. JP-A-2-97555 proposes a process of mixing a polyarylene oxide to a liquid-crystal polyester in order to improve solder heat resistance, while U.S. Pat. No. 5,498,689 and JP-A-6-122762 propose a process of mixing an amine-modified polyphenylene ether with a liquid-crystal polyester. Neither process is sufficient for reconciling color tone, less generation of foreign matter, heat resistance and moldability.

An object of the invention is therefore to provide a resin composition which can simultaneously attain color tone, moldability, heat resistance, flame retardancy and mechanical properties at a sufficient level and particularly, is excellent in color tone and less generation of foreign matter.

DISCLOSURE OF THE INVENTION

To achieve the above-described object, the present inventors carried out an extensive investigation. As a result, it was found that a resin composition capable of simultaneously attaining color tone, less generation of foreign matter, moldability, heat resistance and flame retardancy at a sufficient level, particularly being excellent in color tone and less generation of foreign matter can be obtained by mixing a functionalized polypheylene ether resin obtained by a specific modifying method and a liquid-crystal polyester, leading to the completion of the invention.

The present invention therefore provides:

1. A resin composition obtained by melt-kneading:
   (A) 99 to 1 wt. % of a functionalized polyphenylene ether resin obtained by reacting a mixture of:
      (a) 100 parts by weight of a polyphenylene ether, and
      (b) 0.01 to 10.0 parts by weight of a modifier selected from non-aromatic conjugated diene compounds, dienophile compounds having one dienophile group and precursors for these diene or dienophile compounds at a reaction temperature of from room temperature to the melting point of (a); and
   (B) 1 to 99 wt. % of a liquid-crystal polyester.
2. The resin composition according to item 1 above, wherein the functionalized polyphenylene ether resin (A) has an average particle size of 10 to 500 μm.
3. The resin composition according to item 1 above, wherein the reaction temperature for obtaining the functionalized polyphenylene ether resin (A) is within a range of from room temperature to the glass transition point of (a).
4. The resin composition according to item 1 above, wherein the reaction temperature for obtaining the functionalized polyphenylene ether resin (A) is within a range of from 120° C. to 220° C.
5. The resin composition according to item 1 above, wherein the modifier (b) is a compound having, in its molecular structure, at least one of (i) a carbon-carbon double bond and (ii) at least one of carboxyl group, oxidized acyl group, imino group, imide group, hydroxyl group and epoxy group.
6. The resin composition according to item 1 above, wherein the modifier (b) is any one of maleic anhydride, maleic acid, fumaric acid, phenyl maleimide, itaconic acid and glycidyl methacrylate.

7. The resin composition according to item 1 above, wherein the modifier (b) is maleic anhydride.
8. The resin composition according to item 1 above, which further comprises (C) 0.001 to 5 parts by weight of a compound containing a polyvalent metal element based on 100 parts by weight, in total, of (A) and (B).
9. The resin composition according to item 8 above, wherein the compound (C) containing a polyvalent metal element is at least one compound selected from ZnO, ZnS, SnO, SnS, zinc stearate, zinc acetate and MgO.
10. The resin composition according to item 1 above, which further comprises (D) 0.1 to 200 parts by weight of an inorganic filler based on 100 parts by weight, in total, of (A) and (B).
11. The resin composition according to item 8 above, which further comprises (D) 0.1 to 200 parts by weight of an inorganic filler based on 100 parts by weight, in total, of (A) and (B).
12. A heat resistant part obtained by molding a resin composition according to any one of items 1 to 11 above.
13. A heat resistant part according to item 12 above, wherein the heat resistant part is for automobiles or office machines.

BEST MODE FOR CARRYING OUT THE INVENTION

The present invention is described more specifically below.

The functionalized polyphenylene ether resin (A) to be used in the invention is obtained by reacting a mixture of (a) 100 parts by weight of a polyphenylene ether and (b) 0.01 to 10.0 parts by weight of a modifier selected from non-aromatic conjugated diene compounds, dienophile compounds having one dienophile group and precursors for these diene or dienophile compounds at a reaction temperature of from room temperature to the melting point of (a).

The polyphenylene ether (a) is a homopolymer and/or copolymer comprising a recurring unit represented by the following formula (1):

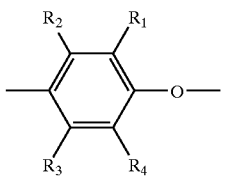

(1)

(wherein $R_1$ and $R_4$ each independently represents a hydrogen atom, a halogen atom, a primary or secondary lower alkyl group, a phenyl group, an aminoalkyl group or a hydrocarbon oxy group; and $R_2$ and $R_3$ each independently represents a hydrogen atom, a primary or secondary lower alkyl group or a phenyl group) and having a reduced viscosity (as measured under the conditions: 0.5 g/dl, chloroform solution, and 30° C.) of 0.15 to 1.0 dl/g. The reduced viscosity preferably is within a range of 0.20 to 0.70 dl/g, with a range of 0.40 to 0.60 being most preferred.

Specific examples of the polyphenylene ether include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). Polyphenylene ether copolymers such as copolymers of 2,6-dimethylphenol and another phenol (such as 2,3,6-trimethylphenyl or 2-methyl-6-butylphenol) are also usable. Among them, poly(2,6-dimethyl-1,4-phenylene ether) and a copolymer of 2,6-dimethylphenol and 2,3,6-trimethylphenol are preferred, of which the poly(2,6-dimethyl-1,4-phenylene ether) is more preferred.

Examples of a manufacturing process of the polyphenylene ether (a) to be used in the invention include the process described in U.S. Pat. No. 3,306,874 wherein 2,6-xylenol is subjected to oxidation polymerization in the presence of a complex of a cuprous salt and amine as a catalyst. The processes described in U.S. Pat. Nos. 3,306,875, 3,257,357 and 3,257,358, JP-B-52-17880, JP-A-50-51197 and JP-A-63-152628 are also preferred as a manufacturing process of the polyphenylene ether (a).

The polyphenylene ether (a) of the invention preferably has an end structure of the following formula (2):

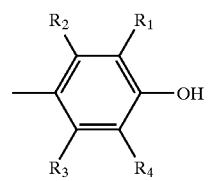

(2)

(wherein, $R_1$, $R_2$, $R_3$ and $R_4$ have the same meanings as $R_1$, $R_2$, $R_3$ and $R_4$ in the above-described formula (1), respectively).

More preferably, the polyphenylene ether (a) of the invention has an end structure of the following formula (2'):

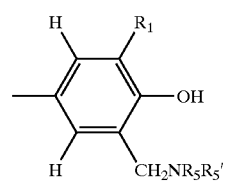

(2')

(wherein, $R_5$ and $R_5'$ each represents a hydrogen atom or an alkyl group).

In the invention, a crystalline polyphenylene ether having a melting point is used as a raw material polyphenylene ether.

Examples of literatures indicating the relation between a crystalline polyphenylene ether and its melting point include "Journal of Polymer Science, Part A-2(6), 1141–1148(1968)", "European Polymer Journal, (9), 293–300(1973)" and "Polymer, (19), 81–84(1978)".

In the invention, the melting point of polyphenylene ether (a) is defined as a peak top temperature of the peak observed on a temperature-heat flow graph obtained by measurement by differential thermal scanning calorimeter (DSC) at a heating rate of 20° C./min. If there exist plural peak top temperatures, the melting point is defined as the maximum one.

Preferably, the polyphenylene ether (a) of the invention is in the powdery form obtained by precipitation of its solution and has a melting point of 240° C. to 260° C. This powder preferably has a fused heat (ΔH), determined from a peak in DSC measurement, of 2 J/g or greater.

The modifier (b) to be used in the invention is selected from non-aromatic conjugated diene compounds, dienophile compounds having one dienophile group or precursors of these diene or dienophile compounds. Among them, the modifier (b) is preferably a compound having, in its molecular structure, at least one of (i) a carbon-carbon double bond and (ii) at least one of carboxyl group, oxidized acyl group, imino group, imide group, hydroxyl group and epoxy group. Preferred examples of the modifier include maleic anhydride, maleic acid, fumaric acid, phenyl maleimide, itaconic acid, glycidyl methacrylate, styrene, acrylic acid, methyl acrylate, methyl methacrylate, stearyl acrylate, allyl alcohol and acrylamide. Among them, the modifier is preferably any one of maleic anhydride, maleic acid, fumaric acid, phenyl maleimide, itaconic acid and glycidyl methacrylate, with maleic anhydride being most preferred.

In the invention, the modifier (b) is added in an amount of 0.01 to 10.0 parts by weight, preferably 0.1 to 5.0 parts by weight, more preferably 0.5 to 3.0 parts by weight based on 100 parts by weight of the polyphenylene ether (a). When the amount of the modifier (b) is less than 0.01 part by weight, an amount of a functional group is insufficient. When the amount exceeds 10.0 parts by weight, on the other hand, a large amount of an unreacted modifier (b) remains in the functionalized polyphenylene ether resin, becoming a cause of silver streaks upon molding.

In the invention, the temperature for reacting the polyphenylene ether (a) with the modifier (b) is from room temperature to the melting point of (a). When the reaction temperature is less than room temperature, the polyphenylene ether (a) does not react sufficiently with the modifier (b). Here, room temperature means 27° C. At a reaction temperature exceeding the melting point of the polyphenylene ether (a), (a) is molten and a viscosity increase occurs, which disturbs mixing with the modifier (b) and, in turn, smooth progress of the reaction. At this time, when the reaction is forcibly caused to progress by vigorous kneading of (a) and (b), the color tone of the polyphenylene ether (a) is deteriorated by heat generated upon kneading.

Moreover, the reaction temperature is preferably from room temperature to the glass transition temperature of the polyphenylene ether (a). A particularly preferred range is 100 to 230° C., with a range of 120 to 220° C. being most preferred.

In the invention, the reaction pressure preferably ranges from 0 to 2 MPa, with a range of 0 to 1 MPa being considerably preferred.

In the invention, the functionalized polyphenylene ether resin (A) is preferably in a solid form and more preferably is a powder having an average particle size of 10 to 500 μm. Here, the term "average particle size" means the size of the most fine sieve among the sieves on which 50% of the whole powder weight remains and it is measured by classifying the powder into each particle size through shaking sieves, and weighing the powder left on each of these sieves. The functionalized polyphenylene ether resin (A) has more preferably an average particle size of 20 to 400 μm, with 50 to 300 μm being still more preferred. The powder having an average particle size less than 10 μm is difficult to handle because of the problems such as flying. The powder having an average particle size greater than 500 μm is, on the other hand, not preferred, because the color tone of a molded product, less generation of black foreign matter, heat resistance and flame retardancy cannot be attained simultaneously at a sufficient level compared with those attained by the resin composition of the invention.

Although no particular limitation is imposed on the reaction method of the polyphenylene ether (a) and the modifier (b) in the invention, preparation using a paddle drier as a reactor is preferred. Efficient preparation can be accomplished using a paddle drier having a jacket set at a desired temperature.

For preparation, use of a Henschel mixer as a reactor is more preferred. Use of a Henschel mixer permits efficient preparation of the functionalized polyphenylene ether resin of the invention, because the polyphenylene ether (a) can be mixed efficiently with the modifier (b) and at the same time, heating is effected by shear heat so that temperature can be controlled. The modifier (b) may be circulated and reacted in the gaseous form.

The functionalized polyphenylene ether resin (A) of the invention can be prepared by adding thereto a reaction assistant. As this reaction assistant, a radical generator, acid, base, organic salt and inorganic salt are preferred. Examples of the radical generator include dialkyl peroxides, diacyl peroxides, peroxycarbonates, hydroperoxides and peroxyketals.

The functionalized polyphenylene ether resin (A) of the invention may be a polyphenylene ether having substantially all the molecular chains thereof functionalized or a polyphenylene ether having, mixed therein, unfunctionalized polyphenylene ether molecular chains and functionalized polyphenylene ether molecular chains. From the viewpoint of color tone and less generation of foreign matter, a ratio of the functionalized polyphenylene ether molecular chains to all the molecular chains is preferably 70% or greater, more preferably 80% or greater, still more preferably 90% or greater and still more preferably 95% or greater.

To 100 parts by weight of the polyphenylene ether (a), the modifier (b) is preferably added in an amount of 0.01 to 10.0 parts by weight. This amount is more preferably 0.1 to 5.0 parts by weight, still more preferably 0.1 to 1.0 parts by weight. Amounts less than 0.01 part by weight are insufficient for alloying with the component (B). Amounts greater than 10.0 parts by weight, on the other hand, become a cause for lowering of heat resistance or deterioration of color tone of a molded product available from the resin composition of the invention.

The functionalized polyphenylene ether resin (A) of the invention may contain an aromatic vinyl polymer within an extent not damaging the characteristics of the invention. Examples of the aromatic vinyl polymer include atactic polystyrene, syndiotactic polystyrene, high impact polystyrene and acrylonitrile-styrene copolymer. When a mixture of a polyphenylene ether resin and an aromatic vinyl polymer is used, the amount of the polyphenylene ether resin is, from the viewpoint of heat resistance, at least 70 wt. %, preferably 80 wt. %, more preferably at least 90 wt. % based on the total amount of the polyphenylene ether resin and aromatic vinyl polymer.

As the liquid-crystal polyester (B) of the invention, known polyesters which are called "thermotropic liquid-crystal polymers" can be used. Examples thereof include thermotropic liquid-crystal polyesters having, as a main constitutional unit, p-hydroxybenzoic acid and polyethylene terephthalate, thermotropic liquid-crystal polyesters having, as a main constitutional unit, p-hydroxybenzoic acid and 2-hydroxy-6-naphthoic acid and thermotropic liquid-crystal polyesters having, as a main constitutional unit, p-hydroxybenzoic acid, 4,4'-dihydroxybiphenyl and terephthalic acid. No particular limitation is imposed on them. As the liquid-crystal polyesters (B) to be used in the invention, those having the following structural units (i) and (ii), and optionally (iii) and/or (iv) are preferred.

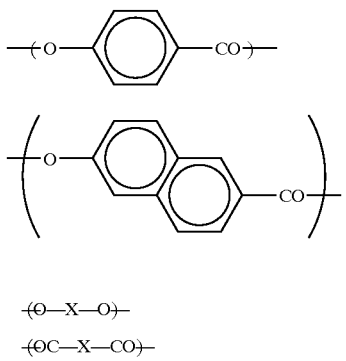

(i)

(ii)

―(―O―X―O―)― (iii)

―(―OC―X―CO―)― (iv)

In the above-described formulas, the structural units (i) and (ii) are a structural unit of polyester prepared from p-hydroxybenzoic acid and a structural unit prepared from 2-hydroxy-6-naphthoic acid. Use of these structural units (i) and (ii) makes it possible to obtain a thermoplastic resin composition of the invention having excellent heat resistance and fluidity and being well balanced in mechanical properties such as rigidity. As X in the above-described structural units (iii) and (iv), one or more than one can be selected freely from the following formulas (3).

(3)

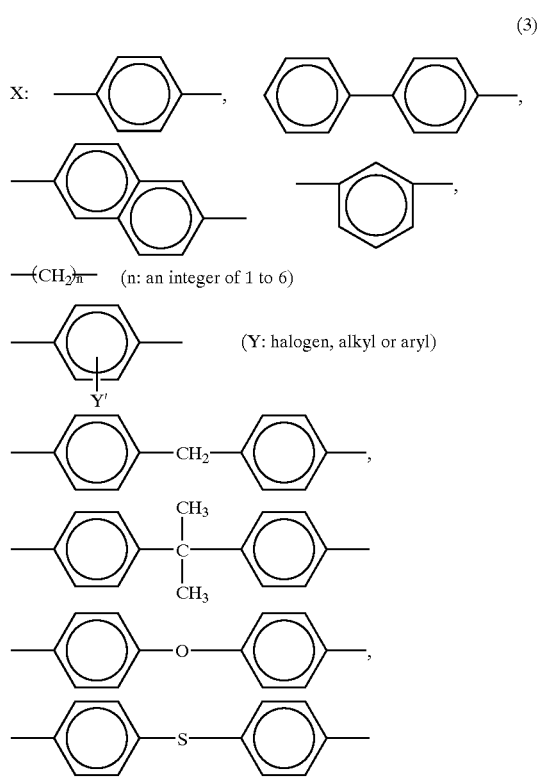

Preferred as the structural formula (iii) is a structural unit prepared from ethylene glycol, hydroquinone, 4,4'-dihydroxybiphenyl, 2,6-dihydroxynaphthalene or bisphenol A, of which that from ethylene glycol, 4,4'-dihydroxybiphenyl or hydroquinone is more preferred, with that from ethylene glycol or 4,4'-dihydroxybiphenyl being particularly preferred. Preferred as the structural formula (iv) is a structural unit prepared from terephthalic acid, isophthalic acid or 2,6-dicarboxynaphthalene, of which that from terephthalic acid or isophthalic acid is more preferred.

As the structural formula (iii) or (iv), one or more than one structural units exemplified above may be used in combination. More specifically, when at least two structural units are used in combination, examples of the combination for the structural formula (iii) include 1) a structural unit prepared from ethylene glycol/a structural unit prepared from hydroquinone, 2) a structural unit prepared from ethylene glycol/a structural unit prepared from 4,4'-dihydroxybiphenyl, 3) a structural unit prepared from hydroquinone/a structural unit prepared from 4,4'-dihydroxybiphenyl.

Examples of the combination for the structural formula (iv) include 1) a structural unit prepared from terephthalic acid/a structural unit prepared from isophthalic acid and 2) a structural unit prepared from terephthalic acid/a structural unit prepared from 2,6-dicarboxynaphthalene. In these two components, the amount of terephthalic acid is preferably 40 wt. % or greater, more preferably 60 wt. % or greater and especially 80 wt. % or greater. By setting the amount of terephthalic acid at 40 wt. % or greater in the two components, the resulting resin composition has relatively good fluidity and heat resistance. Although there is no particular limitation imposed on the using ratio of the structural units (i), (ii), (iii) and (iv) in the liquid-crystal polyester component (B), the structural units (iii) and (iv) are used essentially in an equimolar amount.

A structural unit (v) made of structural units (iii) and (iv) can be used as the structural unit in the component (B). Specific examples include 1) a structural unit prepared from ethylene glycol and terephthalic acid, 2) a structural unit prepared from hydroquinone and terephthalic acid, 3) a structural unit prepared from 4,4'-dihydroxybiphenyl and terephthalic acid, 4) a structural unit prepared from 4,4'-dihydroxybiphenyl and isophthalic acid and 5) a structural unit prepared from bisphenol A and terephthalic acid.

(v)

Into the liquid-crystal polyester component (B) of the invention, another structural unit prepared from an aromatic dicarboxylic acid, aromatic diol or aromatic hydroxycarboxylic acid can be introduced as needed within a range of a small amount not damaging the object of the invention. A temperature at which the component (B) starts indicating a liquid crystal condition in a molten state (which will hereinafter be called "liquid-crystal starting temperature") is preferably 150 to 350° C., more preferably 180 to 320° C., particularly preferably 200 to 300° C. By adjusting the liquid-crystal starting temperature to this range, the resin composition thus obtained has favorable color tone and is well balanced in heat resistance and moldability. The liquid-crystal starting temperature set at 150 to 270° C. is preferred particularly for the appearance of the molded product of the resulting resin composition. In addition, when the liquid-crystal starting temperature is set at 250 to 350° C., the abrasion resistance, chemical resistance, rigidity, creep resistance and rib strength at high temperature of the resulting resin composition can be maintained in a preferable range.

The heat distortion temperature (under a load of 1.82 MPa, in accordance with ASTM D648) of the component (B) of the invention is preferably 130 to 300° C., more preferably 150 to 280° C., particularly preferably 170 to 270° C. By adjusting the heat distortion temperature within the above-described range, the resulting resin composition has desirable heat resistance and relatively good balance in mechanical properties. When the heat distortion temperature is adjusted within a range of 130 to 270° C., the resulting resin composition is imparted with relatively good moldability and hinge properties and is reduced in boss cracks. When the heat distortion temperature is adjusted within a range of 210 to 300° C., the resulting resin composition is imparted with relatively good creep resistance and rigidity at high temperature and a cycle of injection molding can be shortened comparatively.

The dielectric dissipation factor (tan δ) at 25° C. and 1 MHz of the liquid-crystal polyester component (B) of the invention is preferably 0.03 or less, more preferably 0.02 or less. The smaller this dielectric dissipation factor, the smaller a dielectric loss, which makes it possible to suppress generation of an electric noise when the resin composition is used as a raw material for electric electronic parts. Particularly at 25° C. in a high-frequency region, that is, in a region of 1 to 10 GHz, the dielectric dissipation factor (tan δ) is preferably 0.03 or less, more preferably 0.02 or less.

The apparent melt viscosity (shear rate: 100/sec at liquid-crystal starting temperature +30° C.) of the liquid-crystal polyester component (B) of the invention is preferably 100 to 30000 poises, more preferably 100 to 20000 poises, particularly 100 to 10000 poises. By adjusting the apparent melt viscosity within this range, the resulting resin composition has preferable fluidity. The thermal conductivity of the component (B) of the invention under a molten state (liquid-crystal state) is preferably 0.1 to 2.0 W/mK, more preferably 0.2 to 1.5 W/mK, especially 0.3 to 1.0 W/mk. Adjustment of the thermal conductivity under a molten state (liquid-crystal state) within this range makes it possible to relatively shorten the injection molding cycle of the resulting resin composition.

In the invention, the functionalized polyphenylene ether resin composition (A) is added in an amount of 99 to 1 wt. %, preferably 99 to 10 wt. %, more preferably 80 to 20 wt. %. At an amount exceeding 99 wt., the moldability drastically lowers, while at an amount less than 1 wt. %, the functional group of the component (A) does not exhibit its efficacy and sufficient compatibilizing effects are not available.

The liquid-crystal polyester as the component (B) of the invention is added in an amount of 1 to 99 wt. %, preferably 10 t 90 wt. %, more preferably 20 to 80 wt. %. Amounts exceeding 99 wt. % impair exhibition of surface smoothness, causing lowering in appearance and in addition, increase a cost. At an amount less than 1 wt. %, on the other hand, sufficient moldability is not available.

The compound containing a polyvalent metal element (C) in the invention is a compound containing a metal element which may be monovalent, divalent or trivalent. The compound (C) containing a monovalent, divalent and trivalent metal element in the invention is a metal-containing inorganic compound or organic compound. Moreover, the component (C) of the invention is essentially a compound having a metal element as a main component.

Specific examples of the metal element which may be monovalent, divalent or trivalent include Li, Na, K, Zn, Cd, Sn, Cu, Ni, Pd, Co, Fe, Ru, Mn, Pb, Mg, Ca, Sr, Ba and Al elements. Among them, Zn, Sn, Mg, Cd and Al are preferred, with the Zn element being more preferred. Specific examples of the compound containing a metal element which may be monovalent, divalent or trivalent include oxides, sulfides and aliphatic carboxylates of the above-exemplified metal elements. Specific examples of the oxides include $LiO_2$, $Na_2O$, $K_2O$, ZnO, CdO, SnO, CuO, $Cu_2O$, NiO, PdO, CoO, FeO, $Fe_2O_3$, RuO, $RuO_4$, MnO, $MnO_2$, PbO, MgO, CaO, SrO, BaO and $Al_2O_3$. Specific examples of the sulfides include $Li_2S$, $Na_2S$, $K_2S$, ZnS, CdS, SnS, CuS, $Cu_2S$, NiS, PdS, CoS, FeS, $Fe_2S_3$, RuS, $RuS_4$, MnS, $MnS_2$, PbS, MgS, CaS, SrS, BaS and $Al_2S_3$. Examples of the aliphatic carboxylates include lithium stearate, sodium stearate, potassium stearate, zinc stearate, cadmium stearate, tin stearate, copper stearate, nickel stearate, palladium stearate, cobalt stearate, ferrous stearate, ferric stearate, ruthenium stearate, manganese stearate, lead stearate, magnesium stearate, calcium stearate, strontium stearate, barium stearate and aluminum stearate. Among them, preferred are ZnO, ZnS, zinc stearate, CdO, MgO and $Al_2O_3$.

In the invention, the amount of the compound (C) containing a polyvalent metal element is preferably 0.001 to 5 parts by weight, more preferably 0.01 to 3 parts by weight, still more preferably 0.1 to 1 part by weight based on 100 parts by weight, in total, of the components (A) and (B). Co-existence of this component (C) drastically improves impact resistance, particularly, brings about a marked improvement in dart drop impact. When the amount of the component (C) is less than 0.001 part by weight, sufficient effects for improving impact resistance are not available. Amounts exceeding 5 parts by weight, on the other hand, only cause an increase in the specific gravity of the composition.

Examples of the inorganic filler (D), as a strength imparting agent, in the invention include inorganic compounds such as glass fibers, metal fibers, potassium titanate, carbon fibers, silicon carbide, ceramics, silicon nitride, mica, nepheline syenite, talc, wollastonite, slag fibers, ferrite, glass beads, glass powder, glass balloon, quartz, quartz glass, titanium oxide and calcium carbonate. Among them, glass fibers and carbon fibers are preferred for balance among fluidity, heat resistance and mechanical properties. Glass fibers are more preferred. No limitation is imposed on the shape of such inorganic fillers and free selection from fibrous, plate-type and spherical inorganic fillers is possible.

Two or more inorganic fillers exemplified above can be used in combination. If necessary, the inorganic fillers may be provided for use after pretreatment with a coupling agent such as silane and titanium one.

The amount of the inorganic filler (D) is added in an amount of 0.1 to 200 parts by weight, preferably 1 to 100 parts by weight, more preferably 2 to 20 parts by weight based on 100 parts by weight, in total, of the components (A) and (B). Amounts less than 0.1 can not easily impart the resin composition with sufficient rigidity and heat resistance, while amounts exceeding 200 parts by weight can not easily impart the resin composition with sufficient fluidity.

In the invention, another additional component can be added, together with the above-described components, as needed within an extent not impairing the characteristics and advantages of the invention. Examples include antioxidants, flame retardants (such as organic phosphate ester compounds, inorganic phosphorus compounds and aromatic halogen flame retardants), elastomers (such as ethylene/propylene copolymer, ethylene/1-butene copolymer, ethylene/propylene/non-conjugated diene copolymer, ethylene/ethyl acrylate copolymer, ethylene/glycidyl methacrylate copolymer, ethylene/vinyl acetate/glycidyl methacrylate copolymer, ethylene/propylene-maleic anhydride copolymer, olefin copolymer, e.g., ABS, polyester polyether elastomer, polyester polyester elastomer, block copolymer of aromatic vinyl compound and conjugated diene compound, and hydrogenated block copolymer of aromatic vinyl compound and conjugated diene compound), plasticizers (such as oil, low-molecular-weight polyethylene, epoxydized soybean oil, polyethylene glycol and fatty acid ester), flame retardants, weather(light)-resistance improvers, nucleating agents, lubricants, inorganic conductivity imparting agents (such as conductive metal fibers, conductive carbon black and carbon black), various colorants and mold releasing agents.

The resin composition of the invention can be prepared in various manners. For example, it can be prepared by melt-kneading with heat using a single-screw extruder, twin-screw extruder, roll, kneader, Brabender Plastograph or Banbury mixer. Among them, melt-kneading using a twin-screw extruder is most preferred. Although no particular limitation is imposed on the melt-kneading temperature, it can usually be selected freely from 150 to 300° C.

The resin composition can also be prepared by charging the polyphenylene ether (a) and the modifier (b) from a first feed port of an extruder, controlling the temperature inside of the extruder at a position between the first feed port to a second feed port, thereby kneading and reacting the mixture at a temperature of from room temperature or greater but not greater than the melting point of (a) to prepare a functionalized polyphenylene ether resin (A), setting a temperature upstream of the second feed port at a temperature permitting melting of both the components (A) and (B), charging a liquid-crystal polyester (B) from the second feed port and melt-kneading the functionalized polyphenylene ether (A), the liquid-crystal polyester (B) and the like in the extruder.

The resin composition thus obtained can be molded into various parts in a conventionally known manner such as injection molding, extrusion molding and blow molding. Such molded products are excellent in the balance of heat resistance, flame retardancy and fluidity and they are called "heat-resistant parts" in the invention. They are particularly suitable for applications requiring heat resistance and flame retardancy such as heat resistant parts for automobiles and office machines. Examples of the heat resistant parts for automobiles include alternator terminal, alternator connector, IC regulator, potentiometer base for light dimmer, various valves such as exhaust gas valve, joint of engine coolant, carburetor main body, carburetor spacer, exhaust gas sensor, coolant sensor, oil temperature sensor, brake pad wear sensor, throttle position sensor, crank shaft position sensor, air flow meter, brake pad abrasion sensor, thermostat base for air conditioner, flow control valve of heater hot-air, brush holder for radiator motor, water pump impeller, turbine vane, wiper motor parts, distributor, starter switch, starter relay, wire harness for transmission, window washer nozzle, air conditioner panel switch substrate, fuse connector, horn terminal, insulating plate for electrical components, step motor rotor, brake piston, solenoid bobbin, engine oil filter, parts such as ignition device case, wheel cap, lamp socket, lamp housing, lamp extension and lamp reflector. Among them, lamp extension, and lamp reflector are preferred for balance among light weightness, heat resistance, flame retardancy and mechanical properties. As the heat resistant parts for office machines, parts of household or office electric appliances typified by parts of air conditioner, parts of typewriter and parts of word processor; office-computer-related parts; telephone-related parts; facsimile related parts; and copying-machine-related parts are preferred. Among them, peripheral parts of a toner fixing roll of a copying machine are preferred in consideration of the balance among heat resistance, flame retardancy, mechanical properties and specific gravity. Parts obtained by molding a resin composition of the invention added with a conductivity imparting agent are suited as a separator for fuel cell because they are excellent in conductivity, fluidity, heat resistance and flame retardancy.

Reasons why the resin composition of the invention is excellent in physical properties, particularly, excellent in color tone and less generation of black foreign matter has not been clarified completely yet, but they can be presumed for example as follows. Specifically, in order to functionalize a polyphenylene ether, a high temperature process is required in the conventional melting method, which modifies the functional group further or induces side reactions such as transfer reaction of polyphenylene ether molecular chains and causes a change in molecular weight, coloration or generation of black foreign matter. In the invention, on the other hand, the composition is functionalized at a temperature not greater than the melting point of the polyphenylene ether, that is, at a relatively low temperature so that undesirable side reactions of the polymer are suppressed. In addition, it can also be presumed that the functional group of the functionalized polyphenylene ether resin (A) maintains high reactivity without being deactivated and mutual action between the functional group and a hydroxyl or carboxyl group of the liquid-crystal polyester (B) is improved.

EXAMPLES

The present invention will hereinafter be described based on Examples. It should however be borne in mind that the invention is not limited to the following Examples insofar as it does not depart from the scope of the invention.

Preparation Example 1
Preparation Example of Functionalized Polyphenylene Ether (PPE-1)
a-1: Polyphenylene ether (which is poly(2,6-dimethyl-1,4-phenylene ether) having a reduced viscosity of 0.43 and obtained by oxidation polymerization of 2,6-dimethyl phenol and which exhibited a single peak and had a melting point of 250° C., when measured using a differential scanning calorimeter (DSC) assuming that a peak top temperature of the temperature-heat flow graph obtained at a heating rate of 20° C./minute is designated as a melting point.)
b-1: Maleic anhydride In an autoclave equipped with a thermometer for measuring the inside temperature, an oil jacket, and a gas inlet with an agitator, 10 kg of the polyphenylene ether (a-1) and 0.05 kg of the modifier (b-1) were charged. At room temperature, an inside pressure was reduced to 10 mmHg through the gas inlet, followed by introduction of nitrogen of an atmospheric pressure to charge the inside with nitrogen.

After repetition of the above-described operation three times, the autoclave was hermetically sealed. The (a-1) and (b-1) discharged from the system upon pressure reduction and nitrogen purging were collected. The (a-1) and (b-1) discharged from the system were found to be 0.1 kg and 0.008 kg, respectively.

An oil set at 200° C. was circulated through the oil jacket to operate the agitator and stirring was continued for 1 hour. After oil circulation was stopped and the autoclave was allowed to stand until the inside temperature became room temperature, the autoclave was opened and the contents (c-1) in the powdery form were collected. It was found that the contents did not contain molten substances and the mass of the contents (c-1) was 10.0 kg.

The contents (c-1) were washed with 50 liter of acetone, followed by filtration through a filter. This operation was repeated five times to obtain the washed substance 1 (d-1) and filtrate 1 (e-1). Analysis results of gas chromatogram revealed that the modifier (b-1) contained in the filtrate 1 (e-1) was 0.005 kg. A 20 g portion of a dried substance obtained by drying of the washed substance 1 (d-1) was subjected to reflux extraction from 40 ml of acetone by using a Soxhlet extractor, whereby a washed substance 2 (g-1) with hot acetone and an extract (h-1) were obtained. Analysis results of gas chromatogram revealed that no modifier (b-1) was contained in the extract (h-1).

The dried substance 1 (f-1) was inserted between a laminate of a polytetrafluoroethylene sheet, aluminum sheet and iron sheet which had been stacked in this order and then compression molded at 10 MPa, whereby a film (i-1) was obtained. By similar operations, a film (a-1) was obtained from the polyphenylene ether (a-1). The infrared spectroscopic analysis of the resulting film (i-1) was made using a "FT/IR-420 model" Fourier transform infrared spectrophotometer manufactured by Nippon Bunkosha Co., Ltd., resulting in observation, at 1790 cm$^{-1}$, of a peak derived from maleic acid added to the polyphenylene ether. The amount of the modifier (b-1) added to the polyphenylene ether was found to be 0.31 part by weight.

This dried substance 1 (f-1) was provided for Examples as the functionalized polyphenylene ether (PPE-1). It was found to have an average particle size of 110 μm.

Preparation Example 2
Preparation Example of Functionalized Polyphenylene Ether (PPE-2)

In a similar manner to Preparation Example 1 except for the addition of 0.3 part by weight of 2,5-dimethyl-2,5-bis(t-butylperoxy)hexane upon charging, the functionalized polyphenylene ether (PPE-2) was obtained. It was confirmed that the resulting product had the modifier (b-1) added thereto in an amount of 0.40 part by weight and had an average particle size was 140 μm.

Preparation Example 3
Preparation Example of Functionalized Polyphenylene Ether (PPE-3)

In an autoclave tank, 0.5 kg of the modifier (b-1) was charged and the autoclave was pipe-connected with a "FM10C/I model" Henschel mixer manufactured by Mitsui Mining Co., Ltd. In the Henschel mixer, 2 kg of the polyphenylene ether (a-1) in the powdery form was charged. It was stirred at 600 rpm while the tank was purged with a nitrogen gas stream. An oil of 200° C. was fed to the jacket of the mixer, and the polyphenylene ether (a-1) powder was heated until it became 190° C. The autoclave tank was then put into an oil bath to adjust the temperature of the modifier (b-1) in the tank at 190° C. When the temperatures of the polyphenylene ether (a-1) powder and modifier (b-1) became stable at 190° C., 1 L/min of nitrogen was fed from the autoclave tank to the direction of the Henschel mixer and a gas mixture of the modifier (b-1) and nitrogen was fed to the Henschel mixer. At this time, the outlet valve of the Henschel mixer for nitrogen was opened to permit continuous circulation of the gas mixture of the modifier (b-1) and nitrogen. Without changing the condition, stirring and gas circulation were continued for 20 minutes. Twenty minutes later, the oil of 200° C. was taken out from the jacket and instead, an oil of room temperature was fed to cool the polyphenylene ether powder in the mixer tank to room temperature. The polyphenylene ether powder thus obtained was extracted from hot acetone as in Example 1 to remove the unreacted modifier (b-1), whereby the functionalized polyphenylene ether (PPE-3) was obtained. It was confirmed that the resulting product had the modifier (b-1) added thereto in an amount of 0.56 part by weight and had an average particle size of 120 μm.

Referential Example 1
Referential Example of Polyphenylene Ether (PPE-4)

The polyphenylene ether (a-1) powder which was a raw material employed in Preparation Example 1 was designated as the polyphenylene ether (PPE-4). Its average particle size was found to be 90 μm.

Referential Example 2
Referential Example of Polyphenylene Ether Modified by Melting (PPE-5)

A reaction was conducted by melt-kneading 100 parts by weight of the polyphenylene ether (a-1) and 1 part by weight of the modifier (b-1) in a twin screw extruder ("ZSK-25", manufactured by WERNER & PFLEIDERER Corp.) set at 300° C. and equipped with a vent port. The pellets thus obtained were pulverized, followed by washing with acetone, whereby the polyphenylene ether modified by melting (PPE-5) was obtained. It was confirmed that the resulting product had the modifier (b-1) added thereto in an amount of 0.41 part by weight and had an average particle size of 900 μm.

Preparation Example 4
Preparation Example of Liquid-crystal Polyester (LCP-1)

Under a nitrogen atmosphere, p-hydroxybenzoic acid, 2-hydroxy-6-naphthoic acid and acetic anhydride were charged, followed by melting under heat and polycondensation, whereby the liquid-crystal polyester (LCP-1) having the below-described theoretical structural formula was obtained. The component ratio of the composition is indicated by a molar ratio.

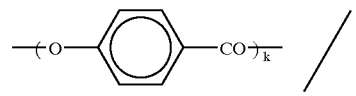

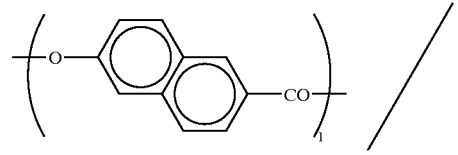

k/l = 0.73/0.27

Preparation Example 5
Preparation Example of Liquid-crystal Polyester (LCP-2)

Under a nitrogen atmosphere, p-hydroxybenzoic acid, polyethylene terephthalate and acetic anhydride were charged, followed by melting under heat and polycondensation, whereby the liquid-crystal polyester (LCP-2) having the below-described theoretical structural formula was obtained. The component ratio of the composition is indicated by a molar ratio.

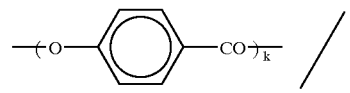

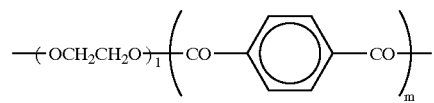

k/l/m = 0.82/0.18/0.18

Preparation Example 6
Preparation Example of Liquid-crystal Polyester (LCP-3)

Under a nitrogen atmosphere, p-hydroxybenzoic acid, 2-hydroxy-6-naphthoic acid, polyethylene terephthalate and acetic anhydride were charged, followed by melting under heat and polycondensation, whereby the liquid-crystal polyester (LCP-3) having the below-described theoretical structural formula was obtained. The component ratio of the composition is indicated by a molar ratio.

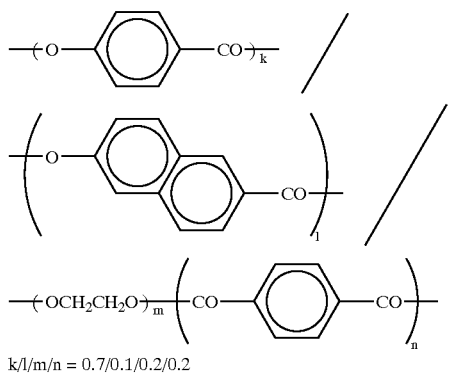

k/l/m/n = 0.7/0.1/0.2/0.2

Preparation Example 7
Preparation Example of Liquid-crystal Polyester (LCP-4)

Under a nitrogen atmosphere, p-hydroxybenzoic acid, 2-hydroxy-6-naphthoic acid, hydroquinone, isophthalic acid and acetic anhydride were charged, followed by melting under heat and polycondensation, whereby the liquid-crystal polyester (LCP-4) having the below-described theoretical structural formula was obtained. The component ratio of the composition is indicated by a molar ratio.

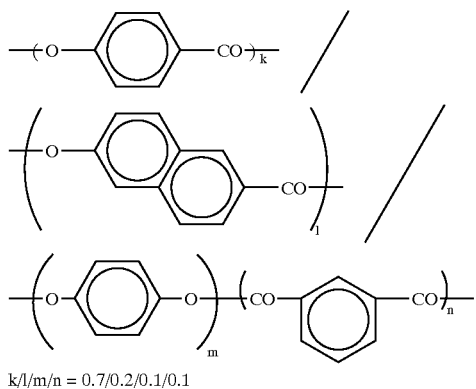

k/l/m/n = 0.7/0.2/0.1/0.1

Referential Example 3
Referential Example of Master Batch Pellets as an Additive After dry blending of 23 parts by weight of tris(2,4-di-t-butylphenyl)phosphite ("Mark 2112", product of Asahi Denka Kogyo K.K.), 23 parts by weight of zinc oxide (JIS Special Grade, product of Wako Pure Chemicals Industries, Ltd.), 23 parts by weight of zinc sulfide (JIS Special Grade, product of Wako Pure Chemical Industries, Ltd.) and 31 parts by weight of polystyrene ("H9405", product of A&M Styrene Co., Ltd.), the mixture was melt-kneaded by a twin screw extruder ("ZSK-25", manufactured by WERNER & PFLEIDERER Corp.) set at 230° C. and equipped with a vent port, whereby master batch pellets were obtained as a stabilizer. These pellets were provided for Examples as a stabilizer (hereinafter abbreviated as "MB").

Physical properties of each of the resin compositions were each evaluated in the following manner.

(1) Molding:

The pellets obtained in Examples or Comparative Examples were molded using an injection molder ["IS-80EPN", manufactured by Toshiba Machine Co., Ltd.] set at a cylinder temperature of 330/330/320/310° C., injection rate of 85% and mold temperature of 90° C. The pellets obtained in Examples 10 and 11 and Comparative Example 4 were however molded at a cylinder temperature of 275/275/265/255° C., injection rate of 60% and mold temperature of 70° C.

(2) Color Tone:

The pellets were molded into a plate piece of 90 mm long, 50 mm wide and 2.5 mm thick and L, a and b of the molded product at 23° C. were measured using a calorimeter ("ZE2000", product of Nippon Denshoku Kogyo Co., Ltd.). In accordance with the below-described equation, whiteness: W (Lab) was calculated. The higher whiteness means better color tone.

$$W\ (\mathrm{Lab}) = 100 - ((100-L)^2 + a^2 + b^2)^{1/2}$$

(3) Less Generation of Black Foreign Matter:

After retention for 5 minutes upon molding, a plate of 90×50×2.5 mm was molded under the above-described conditions (1). The resulting molded plate was pulverized and the whole amount was dissolved in 100 ml of chloroform. The solution was filtered through a filter paper of 10 cm in diameter. After completion of the filtration, the number of black foreign matter(s) was counted with the naked eye. The white solid was liquid-crystal polyester or inorganic filler insoluble in chloroform so it was not counted.

(4) Fluidity:

A gauge pressure when a 1-mm short appeared upon molding of the pellets obtained in the Examples into an ASTM dumbbell specimen of 3.2 mm thick under the molding conditions described above in (1) was measured. In the below-described table, this pressure is expressed as SSP (MPa), (abbreviation of Short Shot Pressure).

(5) Heat Resistance (DTUL):

The pellets obtained in the Examples were molded into an ASTM strip specimen of 3.2 mm thick under the molding conditions described above in (1). Heat distortion temperature of the resulting specimen was measured under a load of 1.82 MPa.

(6) Flame Retardancy:

An ASTM strip specimen of 1.6 mm thick×127 mm long×12.7 mm wide was obtained by molding and a burning test was conducted based on UL-94 Vertical Burning Test of Underwriters Laboratories. Described specifically, this burning test was made on five specimens. Assuming that a time from removal of a flame after ignition of each specimen therewith for 10 seconds until extinction of the flame is a combustion time $t_1$ (second) and a time from removal of a flame after ignition of the specimen therewith again for 10 seconds until extinction of the flame is a combustion time $t_2$ (second), an average combustion time of $t_1$ and $t_2$ of each of five specimens was determined. In addition, it was rated as V-0, V-1 or V-2 in accordance with the UL standards.

(7) Flexural Properties:

A bending test of an ASTM strip specimen of 3.2 mm thick was conducted at a span distance of 50 mm and test speed of 3 mm/min by using an autograph ("AG-5000", product of Shimadzu Corporation), whereby a flexural modulus (FM) and flexural strength (FS) were measured.

(8) Tensile Properties:

A tensile test of an ASTM dumbbell specimen of 3.2 mm thick was conducted at a chuck distance of 115 mm and test speed of 20 mm/min by using an autograph ("AG-5000", product of Shimadzu Corporation), whereby a tensile modulus (TM) and tensile strength (TS) were measured.

(9) Impact Resistance:

(9-1) Dart Impact and Ductile Fracture:

Measurement of the specimen similar to that employed in the above (2) was conducted under a dropping load of 6.5 kg and drop height of 100 cm by using a dart impact tester (product of Toyo Seiki Co., Ltd.) and whole absorption energy, which is the sum of cracking energy and propagation energy upon fracture was designated as a dart impact (J/m). The greater the dart impact, the better impact resistance. When a plate specimen is observed from a thickness direction after the fracture test, a state wherein deformation as if hammered thin has occurred at the dart dropped part is defined as ductile fracture, while a state wherein complete gouging has occurred at the dart dropped part but the test piece is flat without deformation is defined as brittle fracture. Based on the above-described standards, ductile fracture was judged. The number of tests was set at n=5.

○: Ductile fracture occurred at any test n=5.

Δ: Ductile fracture occurred 1 to 4 times of n=5, while brittle fracture occurred at the remaining test(s).

x: Brittle fracture occurred at any test n=5.

Examples 1 to 5 and 8

The functionalized polyphenylene ether (PPE-1, PPE-2 or PPE-3) and the liquid-crystal polyester (LCP-1, LCP-2, LCP-3 or LCP-4) were melt-kneaded at a ratio (parts by weight) as shown in Table 1 by using a twin-screw extruder ("ZSK-25", product of WERNER & PFLEIDERER Corp.) set at 250 to 300° C. and equipped with a vent port. The pellets thus obtained were molded in the above-described manner and physical properties of the molded product were evaluated. The results are shown in Table 1.

Examples 6, 9 and 11

In a similar manner to Example 1 except that the functionalized polyphenylene ether (PPE-1 or PPE-3) as a functionalized polyphenylene ether resin and the liquid-crystal polyester (LCP-2, LCP-3 or LCP4) were used; glass fibers ("Microglass RES03-TP30", product of NGF Company, these glass fibers which may hereinafter be abbreviated as "GF") were added by side feeding; and they were added at a ratio (parts by weight) as shown in Table 1. The pellets thus obtained were molded in the above-described manner and physical properties of the molded product were evaluated. The results are shown in Table 1.

Example 7

In a similar manner to Example 1 except that the functionalized polyphenylene ether (PPE-1) as a functionalized polyphenylene ether resin and the high impact polystyrene ("H9405", product of A&M Styrene Co., Ltd., which styrene may hereinafter be abbreviated as "HIPS") were used and components were mixed at a ratio as shown in Table 1, pellets were obtained. The resulting pellets were molded in the above-described manner and physical properties of the molded product were evaluated. The results are shown in Table 1.

Comparative Example 1

In a similar manner to Example 1 except for the use of the un-functionalized polyphenylene ether (PPE-4) was used instead of the functionalized polyphenylene ether (PPE-1), pellets were obtained. The resulting pellets were molded in the above-described manner and physical properties of the molded product were evaluated. The results are shown in Table 1.

Comparative Example 2

In a similar manner to Example 1 except that the polyphenylene ether modified by melting (PPE-5) was used instead of the functionalized polyphenylene ether (PPE-1), pellets were obtained. The resulting pellets were molded in the above-described manner and physical properties of the molded product were evaluated. The results are shown in Table 1.

Comparative Example 3

In a similar manner to Example 1 except for the omission of a liquid-crystal polyester, pellets were obtained. The resulting pellets were molded in the above-described manner and physical properties of the molded product were evaluated. The results are shown in Table 1.

Examples 10 and 11

In a similar manner to Example 1 except that components were used at a ratio as shown in Table 1 and the temperature of the twin-screw extruder equipped with a vent port was set at 170 to 275° C., pellets were obtained. The resulting pellets were molded in the above-described manner and physical properties of the molded product were evaluated. The results are shown in Table 1.

Comparative Example 4

In a similar manner to Example 10 except for the use of the un-functionalized polyphenylene ether (PPE-4) instead of the functionalized polyphenylene ether (PPE-1), pellets were obtained. The resulting pellets were molded in the above-described manner and the physical properties of the molded product were evaluated. The results are shown in Table 1.

TABLE 1

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Com- position | (A) | PPE-1 | 95 | 93 | 90 |  |  | 85 | 90 |  |
|  |  | PPE-2 |  |  |  | 95 | 97 |  |  |  |
|  |  | PPE-3 |  |  |  |  |  |  |  | 95 |
|  |  | PPE-4 |  |  |  |  |  |  |  |  |

TABLE 1-continued

| | | | | | | | | | | |
|---|---|---|---|---|---|---|---|---|---|---|
| | | PPE-5 | | | | | | 5 | | |
| | | HIPS | | | | | | | | |
| | (B) | LCP-1 | 5 | 4 | 10 | 4 | | | | 2.5 |
| | | LCP-2 | | 3 | | | | | | 2.5 |
| | | LCP-3 | | | | | 3 | 5 | 5 | |
| | | LCP-4 | | | | 1 | | 10 | | |
| | (D) | GF | | | | | | 2 | | |
| Physical properties | Color tone | whiteness W (Lab) | 59.3 | 62.8 | 64.9 | 58.8 | 53.3 | 69.4 | 62.2 | 63.3 |
| | Less generation of black foreign matter | | 15 | 8 | 6 | 12 | 19 | 9 | 16 | 14 |
| | Fluidity | SSP (MPa) | 5.2 | 5.1 | 4.3 | 5.2 | 5.3 | 3.2 | 3.5 | 4.9 |
| | Heat resistance | DTUL (° C.) | 185 | 183 | 181 | 184 | 185 | 185 | 179 | 185 |
| | Flame retardancy | Average combustion time (sec) | 7.4 | 12 | 8.0 | 8.0 | 9.3 | 4.9 | 8.8 | 7.8 |
| | | (UL) | V-1 | V-1 | V-1 | V-1 | V-1 | V-0 | V-1 | V-1 |
| | Bending properties | FM (GPa) | 2.77 | 2.89 | 3.04 | 2.80 | 2.73 | 3.21 | 2.69 | 2.99 |
| | | FS (MPa) | 114 | 126 | 120 | 121 | 112 | 128 | 110 | 117 |
| | Tensile properties | TM (GPa) | 1.76 | 1.83 | 2.02 | 1.73 | 1.74 | 2.21 | 1.71 | 1.79 |
| | | TS (MPa) | 78 | 77 | 66 | 74 | 78 | 81 | 68 | 79 |

| | | | Ex.9 | Com. Ex.1 | Com. Ex.2 | Com. Ex.3 | Ex. 10 | Ex. 11 | Com. Ex. 4 |
|---|---|---|---|---|---|---|---|---|---|
| Composition | (A) | PPE-1 | | | | | 100 | 40 | |
| | | PPE-2 | | | | | | | 40 |
| | | PPE-3 | 80 | | | | | | |
| | | PPE-4 | | 95 | | | | | 40 |
| | | PPE-5 | | | 95 | | | | |
| | | HIPS | | | | | | | |
| | (B) | LCP-1 | | 5 | 5 | | 60 | | 60 |
| | | LCP-2 | 10 | | | | | | |
| | | LCP-3 | 10 | | | | | | |
| | | LCP-4 | | | | | | 60 | |
| | (D) | GF | 10 | | | | | 20 | |
| Physical properties | Color tone | whiteness W (Lab) | 71.1 | 50.4 | 48.6 | 6.9 | 79.2 | 78.4 | 65.2 |
| | Less generation of black foreign matter | | 11 | 61 | 88 | 103 | 2 | 5 | 31 |
| | Fluidity | SSP (MPa) | 3.6 | 5.7 | 5.5 | 8.3 | 2.2 | 3.1 | 2.8 |
| | Heat resistance | DTUL (° C.) | 186 | 182 | 182 | 185 | 174 | 187 | 175 |
| | Flame retardancy | Average combustion time (sec) | 6.2 | 8.5 | 13 | 11 | 4.2 | 3.5 | 4.1 |
| | | (UL) | V-1 | V-1 | V-1 | V-1 | V-0 | V-0 | V-0 |
| | Bending properties | FM GPa | 3.52 | 2.80 | 2.79 | 2.52 | 6.37 | 8.78 | 6.47 |
| | | FS (MPa) | 127 | 121 | 123 | 111 | 143 | 181 | 147 |
| | Tensile properties | TM (GPa) | 2.22 | 1.73 | 1.76 | 1.84 | 2.85 | 3.32 | 2.80 |
| | | TS (MPa) | 84 | 74 | 74 | 73 | 113 | 129 | 114 |

As shown in Table 1, it has been understood that resin compositions of the invention composed of a functionalized polyphenylene ether and a liquid-crystal polyester can simultaneously attain sufficient color tone, moldability, heat resistance, flame retardancy and mechanical properties and particularly, they are excellent in color tone and less generation of black foreign matter. Excellent color tone can widen the design of molded products. Black foreign matter is presumed to appear owing to the progress of carbonization of a portion of the resin composition upon retention under high temperature at the time of extrusion and it may cause a lowering of insulation properties or physical properties. The smaller its content, the better. In electronic circuit parts, black foreign matter adversely affects not only insulation properties but also dielectric loss properties. It disturbs transmission of electric signals, leading to fatal defects of such parts. Accordingly, it has a significant meaning for polyphenylene ether resin compositions to be able to reduce a generation amount of black foreign matter. Even after retention upon molding, the resin compositions of the invention generate a markedly small amount of black foreign matter, meaning excellent heat stability upon molding. This invention is of a marked utility value for the industrial field.

Examples 12 to 17

In a similar manner to Examples 1 to 6 except that a compound selected from any one of ZnO (JIS Special Grade, product of Wako Pure Chemical Industries, Ltd.), ZnS (JIS Special Grade, product of Wako Pure Chemical Industries, Ltd.), the additive master batch pellets (MB) obtained in Referential Example 3, zinc stearate (JIS Special Grade, product of Wako Pure Chemical Industries, Ltd., described as "St$_2$Zn" in Table), SnO (JIS Special Grade, product of Wako Pure Chemical Industries, Ltd.) and MgO (JIS Special Grade, product of Wako Pure Chemical Industris, Ltd.) was added as a polyvalent metal-element-containing compound (C) at a ratio as shown in Table 2, pellets were obtained. The resulting pellets were molded in the above-described manner and physical properties of the product were evaluated. The results are shown in Table 2.

Example 18

In a similar manner to Example 8 except for the addition of 0.15 phr of ZnO (JIS Special Grade; product of Wako Pure Chemical Industries, Ltd.), pellets were obtained. The resulting pellets were molded in the above-described manner and physical properties of the product were evaluated. The results are shown in Table 2.

Comparative Example 5

In a similar manner to Example 12 except for the use of the un-functionalized polyphenylene ether (PPE-4) instead of the functionalized polyphenylene ether (PPE-1), pellets were obtained. The resulting pellets were molded in the above-described manner and physical properties of the product were evaluated. The results are shown in Table 2.

Comparative Example 6

In a similar manner to Example 12 except for the use of the polyphenylene ether (PPE-5) modified by melting instead of the functionalized polyphenylene ether (PPE-1), pellets were obtained. The resulting pellets were molded in the above-described manner and physical properties of the product were evaluated. The results are shown in Table 2.

TABLE 2

| | | | Ex. 12 | Ex. 13 | Ex. 14 | Ex. 15 | Ex. 16 | Ex. 17 | Ex. 18 | Com. Ex. 5 | Com. Ex. 6 |
|---|---|---|---|---|---|---|---|---|---|---|---|
| Composition | (A) | PPE-1 | 95 | 93 | 90 | | | 85 | | | |
| | | PPE-2 | | | | 95 | 97 | | | | |
| | | PPE-3 | | | | | | | 95 | | |
| | | PPE-4 | | | | | | | | 95 | |
| | | PPE-5 | | | | | | | | | 95 |
| | (B) | LCP-1 | 5 | 4 | 10 | 4 | | | 2.5 | 5 | 5 |
| | | LCP-2 | | 3 | | | | | 2.5 | | |
| | | LCP-3 | | | | 1 | 3 | 5 | | | |
| | | LCP-4 | | | | | | 10 | | | |
| | (C) | Kind | ZnO | ZnO | MB | St2Zn | SnO | MgO | ZnO | ZnO | ZnO |
| | | (amount phr) | (0.15) | (0.15) | (1.0) | (0.15) | (0.15) | (0.30) | (0.15) | (0.15) | (0.15) |
| | | | — | ZnS (0.15) | — | — | — | — | — | — | — |
| | (D) | GF | | | | | | | 2 | | |
| Physical Properties | Impact resistance | Dart (J/m) | 54.4 | 52.4 | 54.3 | 56.1 | 39.1 | 41.0 | 50.4 | 8.6 | 6.4 |
| | | Ductile fracture | ○ | ○ | ○ | ○ | Δ | Δ | ○ | X | X |
| | Color tone | Whiteness W (Lab) | 61.1 | 64.2 | 85.3 | 80.8 | 55.1 | 70.4 | 62.2 | 51.2 | 50.3 |
| | Less generation of black foreign matter | | 10 | 14 | 5 | 10 | 19 | 7 | 8 | 85 | 132 |
| | Fluidity | SSP (MPa) | 5.5 | 5.3 | 4.4 | 5.7 | 5.6 | 3.5 | 5.4 | 7.2 | 6.9 |
| | Heat resistance | DTUL (° C.) | 184 | 183 | 182 | 182 | 184 | 185 | 185 | 182 | 182 |
| | Flame retardancy | Average combustion time (sec) | 7.8 | 8.2 | 9.8 | 11.1 | 8.2 | 7.9 | 8.5 | 11.3 | 17 |
| | | (UL) | V-1 | V-1 | V-1 | V-1 | V-1 | V-1 | V-1 | V-1 | V-1 |
| | Bending properties | FM (GPa) | 2.78 | 2.92 | 3.11 | 2.71 | 2.72 | 3.22 | 2.91 | 2.79 | 2.76 |
| | | FS (MPa) | 111 | 127 | 122 | 118 | 114 | 129 | 115 | 118 | 117 |
| | Tensile properties | TM (GPa) | 1.79 | 1.81 | 2.04 | 1.70 | 1.73 | 2.23 | 1.78 | 1.71 | 1.73 |
| | | TS (MPa) | 76 | 76 | 65 | 72 | 78 | 84 | 80 | 71 | 72 |

As shown in Table 2, it has been found that by adding a trace of a polyvalent-metal-element-containing compound to the resin composition of the invention, more specifically, by mixing, in the solid phase, predetermined amounts of a functionalized polyphenylene ether resin, liquid-crystal polyester and polyvalent-metal-element-containing compound, dart impact properties as well as color tone, less generation of black foreign matter, fluidity, heat resistance, flame retardancy and mechanical properties can be attained at a markedly high level.

Industrial Applicability

The present invention makes it possible to provide resin compositions having a sufficient level of color tone, moldability, heat resistance, flame retardancy and mechanical properties attained simultaneously and particularly, being excellent in color tone and less generation of foreign matter.

What is claimed is:

1. A resin composition obtained by melt-kneading:
   (A) 99 to 1 wt. % of a functionalized polyphenylene ether resin obtained by reacting a mixture of:
      (a) 100 parts by weight of a polyphenylene ether, and
      (b) 0.01 to 10.0 parts by weight of a modifier selected from the group consisting of non-aromatic conjugated diene compounds, dienophile compounds having one dienophile group and precursors for these diene or dienophile compounds at a reaction temperature of from room temperature to the melting point of (a) at which component (a) is in a solid state; and (B) 1 to 99 wt. % of a liquid-crystal polyester.

2. The resin composition according to claim 1, wherein the functionalized polyphenylene ether resin (A) has an average particle size of 10 to 500 μm.

3. The resin composition according to claim 1, wherein the reaction temperature for obtaining the functionalized polyphenylene ether resin (A) is within a range of from room temperature to the glass transition point of (a).

4. The resin composition according to claim 1, wherein the reaction temperature for obtaining the functionalized polyphenylene ether resin (A) is within a range of from 120° C. to 220° C.

5. The resin composition according to claim 1, wherein the modifier (b) is a compound having, in its molecular structure, at least one of (i) a carbon-carbon double bond and (ii) at least one of carboxyl group, oxidized acyl group, imino group, imide group, hydroxyl group and epoxy group.

6. The resin composition according to claim 1, wherein the modifier (b) is any one of maleic anhydride, maleic acid, fumaric acid, phenyl maleimide, itaconic acid and glycidyl methacrylate.

7. The resin composition according to claim 1, wherein the modifier (b) is maleic anhydride.

8. The resin composition according to claim 1, which further comprises (C) 0.001 to 5 parts by weight of a compound containing a polyvalent metal element based on 100 parts by weight, in total, of (A) and (B).

9. The resin composition according to claim 8, wherein the compound (C) containing a polyvalent metal element is at least one compound selected from consisting of ZnO, ZnS, SnO, SnS, zinc stearate, zinc acetate and MgO.

10. The resin composition according to claim 1, which further comprises (D) 0.1 to 200 parts by weight of an inorganic filler based on 100 parts by weight, in total, of (A) and (B).

11. The resin composition according to claim 8, which further comprises (D) 0.1 to 200 parts by weight of an inorganic filler based on 100 parts by weight, in total, of (A) and (B).

12. A heat resistant part obtained by molding a resin composition according to any one of claims 1 to 11.

13. A heat resistant part according to claim 12, wherein the heat resistant part is for automobiles or office machines.

* * * * *